United States Patent [19]

Hanson

[11] 4,366,386
[45] Dec. 28, 1982

[54] MAGNUS AIR TURBINE SYSTEM

[76] Inventor: Thomas F. Hanson, 24204 Heritage La., Newhall, Calif. 91321

[21] Appl. No.: 262,136

[22] Filed: May 11, 1981

[51] Int. Cl.³ .................. F03B 5/00; F03D 7/06; H02P 9/04

[52] U.S. Cl. .................. 290/44; 290/55; 416/4

[58] Field of Search .......... 290/43, 44, 54, 55; 416/4

[56] References Cited

FOREIGN PATENT DOCUMENTS 250636  4/1926  United Kingdom .......... 416/4

Primary Examiner—J. V. Truhe
Assistant Examiner—Shelley Wade
Attorney, Agent, or Firm—Daniel T. Anderson

[57] ABSTRACT

A Magnus effect windmill for generating electrical power is disclosed. A large nacelle-hub mounted pivotally (in Azimuth) atop a support tower carries, in the example disclosed, three elongated barrels arranged in a vertical plane and extending symmetrically radially outwardly from the nacelle. The system provides spin energy to the barrels by internal mechanical coupling in the proper sense to cause, in reaction to an incident wind, a rotational torque of a predetermined sense on the hub. The rotating hub carries a set of power take-off rollers which ride on a stationary circular track in the nacelle. Shafts carry the power, given to the rollers by the wind driven hub, to a central collector or accumulator gear assembly whose output is divided to drive the spin mechanism for the Magnus barrels and the main electric generator. A planetary gear assembly is interposed between the collector gears and the spin mechanism functioning as a differential which is also connected to an auxiliary electric motor whereby power to the spin mechanism may selectively be provided by the motor. Generally, the motor provides initial spin to the barrels for start-up after which the motor is braked and the spin mechanism is driven as though by a fixed ratio coupling from the rotor hub. During high wind or other unusual conditions, the auxiliary motor may be unbraked and excess spin power may be used to operate the motor as a generator of additional electrical output. Interposed between the collector gears of the rotating hub and the main electric generator is a novel variable speed drive-fly wheel system which is driven by the variable speed of the wind driven rotor and which, in turn, drives the main electric generator at constant angular speed. Reference is made to the complete specification for disclosure of other novel aspects of the system such as, for example, the aerodynamic and structural aspects of the novel Magnus barrels as well as novel gearing and other power coupling combination apparatus of the invention. A reading of the complete specification is recommended for a full understanding of the principles and features of the disclosed system.

13 Claims, 12 Drawing Figures

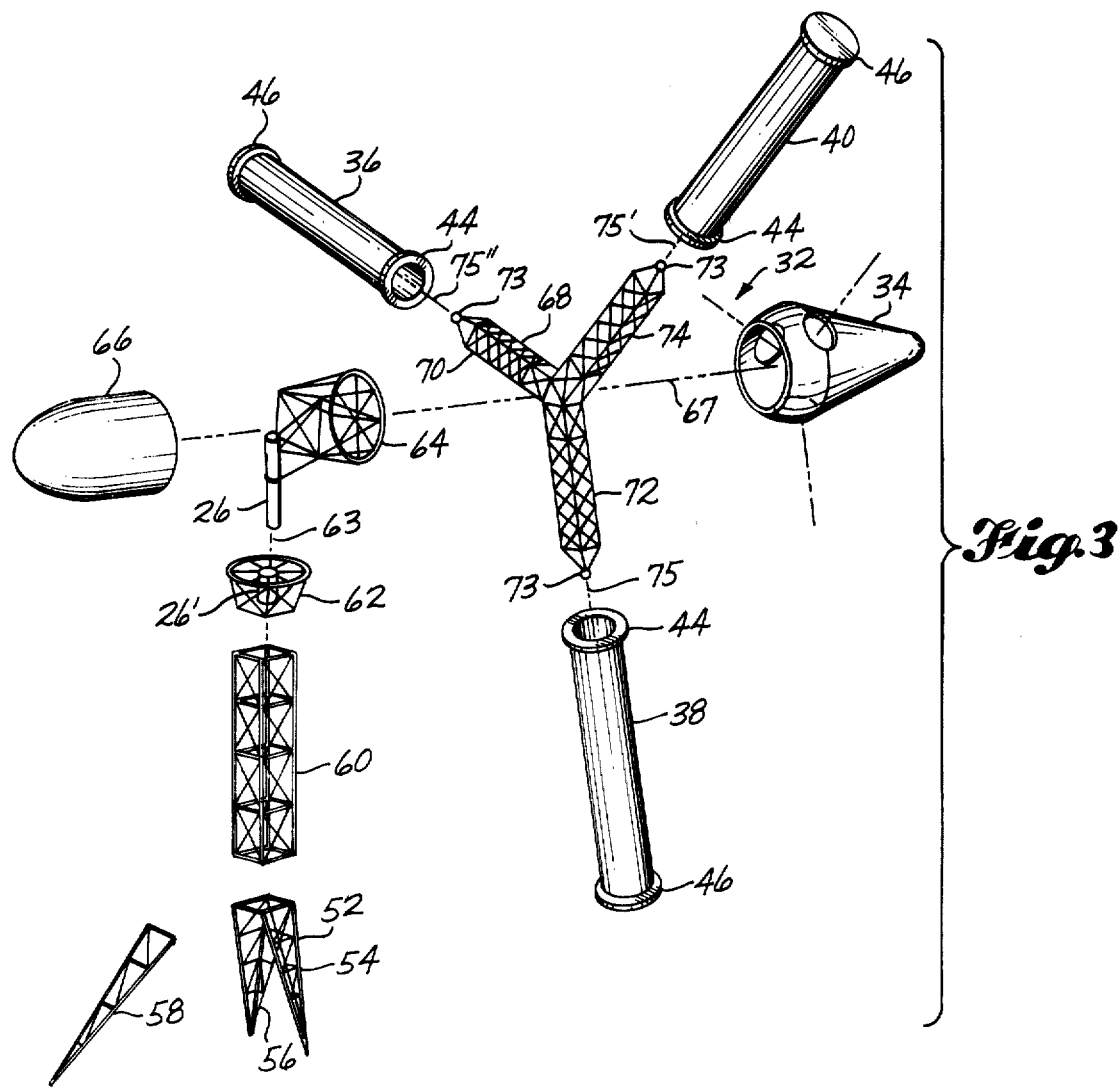
Fig. 3
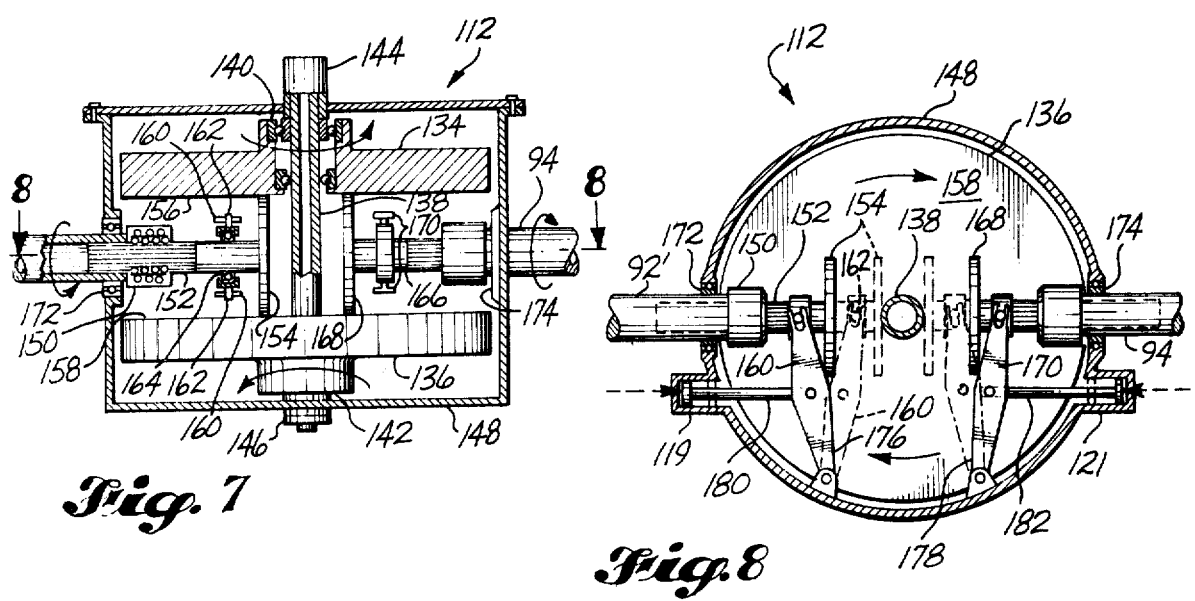
Fig. 7
Fig. 8

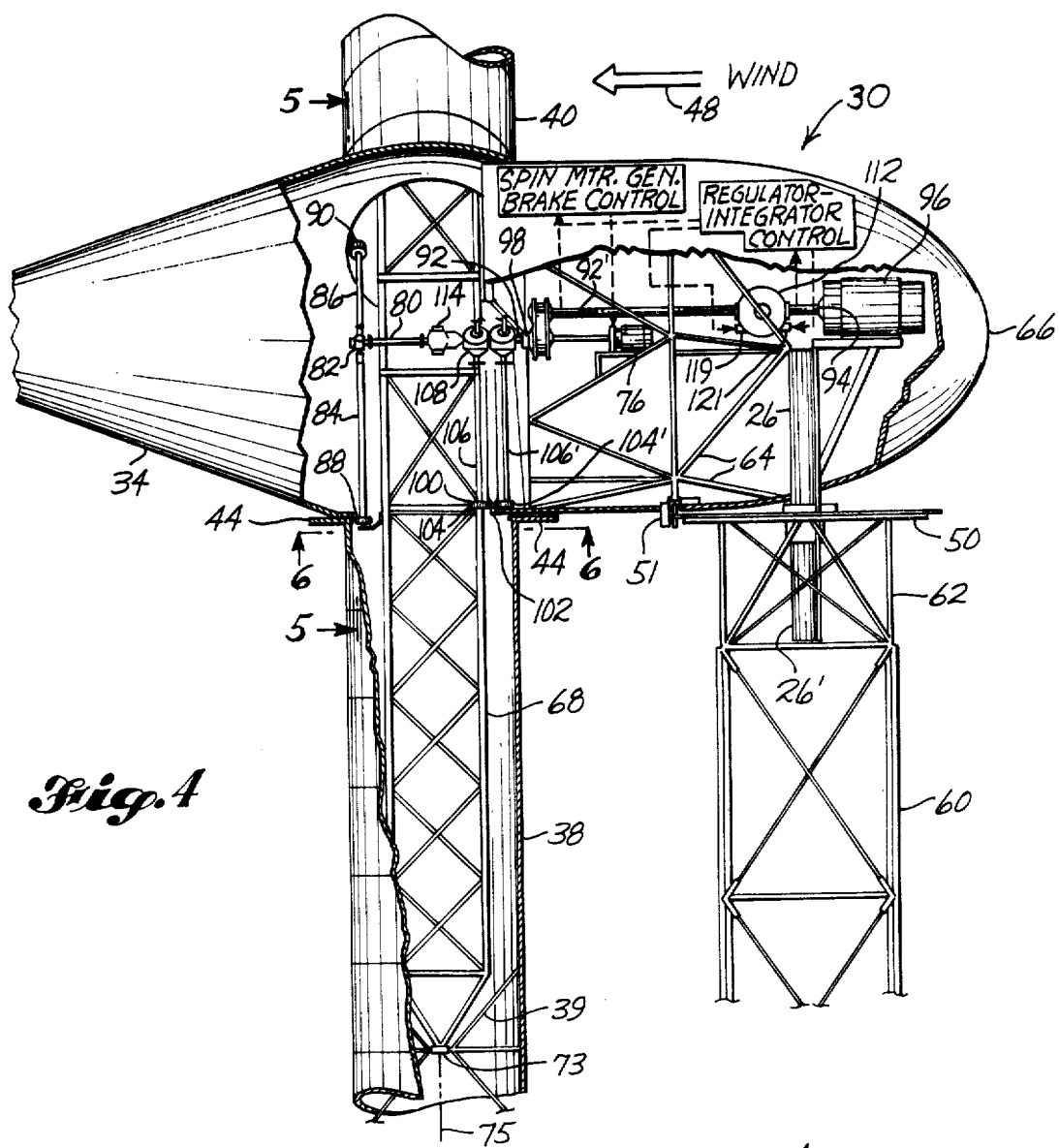
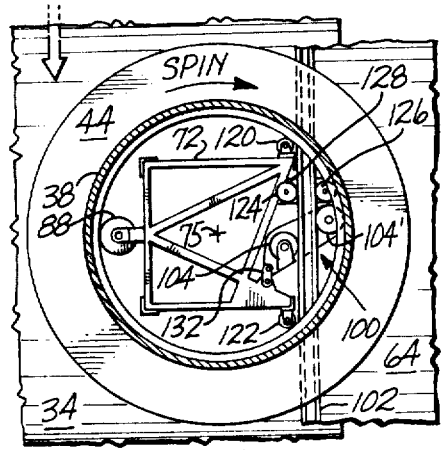
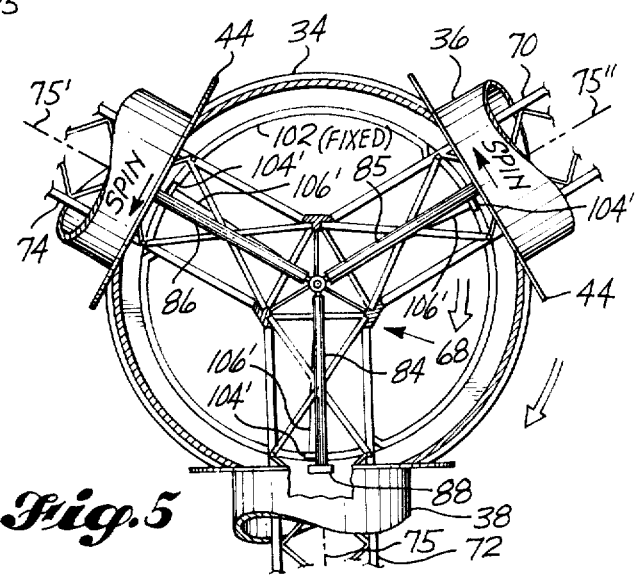

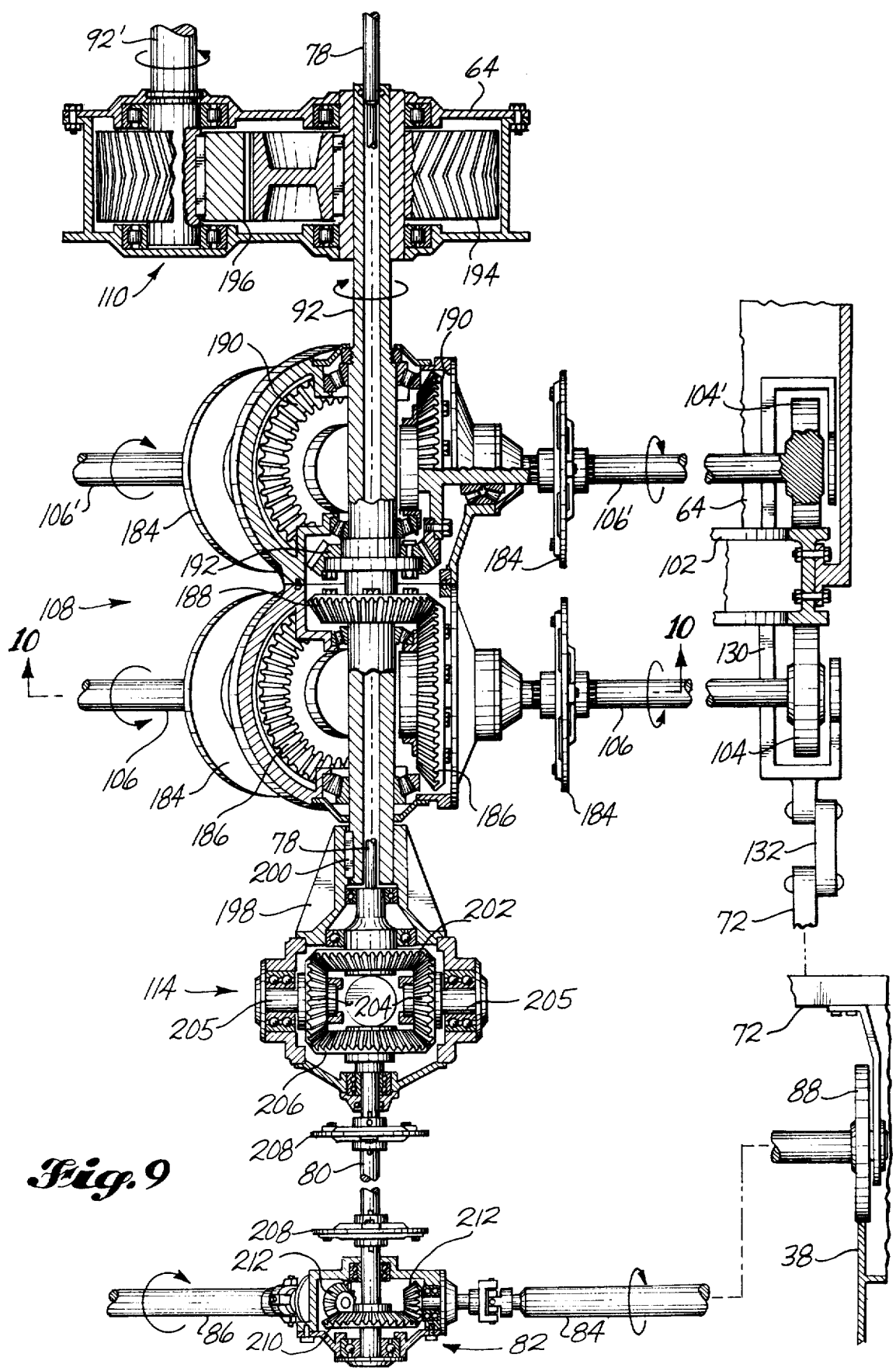

MAGNUS AIR TURBINE SYSTEM

FIELD OF THE INVENTION

The invention relates generally to windmills for deriving useable power from natural wind energy and more specifically to a Magnus effect wind turbine for providing electrical energy. Although the present invention finds particularly useful application in the field of providing constant voltage and frequency current for utilization into a network of various power sources serving communities of consumers, and although, in the cause of brevity and clarity, much of the following discussion and description of examples of the invention are directed theretoward, it is expressly to be understood that the advantages of the invention are equally well manifest in other applications such as the direct utilization of wind energy to provide mechanical power as for locomotion or as in remote areas for water pumping. Additionally, the invention is equally advantageous in providing direct current electrical power and then inverting it to alternating current or storing it chemically in batteries or mechanically as in flywheels or elevated water or the like.

BACKGROUND OF THE INVENTION

The advantages, or even the necessity, of harnessing wind energy in historical times as well as in the near future are obvious. Unfortunately, however, the development of wind machines suffered a hiatus in recent decades because of the abundance for a time of very inexpensive oil as an energy source and, concomittently, because of very inexpensive means of distributing the oil, or its resultant energy in other forms, to even the remotest of areas. The acceleration currently of the development of wind machine technology is also apparent and very well understood. What is not as obvious is the very high cost and other disadvantages of harnessing the otherwise free and abundant wind energy by the utilization of prior art approaches. Windmills being considered for development at this time using conventional approaches all suffer at least some of the following, serious disadvantages or limitations: they are unacceptably high in total cost per kilowatt hour when their construction, maintenance, and amortization or replacement costs are considered; they are high in weight per kilowatt of capability; they are vulnerable to storm damage; to optimize aerodynamic efficiency, their rotor tip velocity is very high causing among others, the disadvantage of having a large, hazard radius with respect to catastrophic blade failure; they have a narrow range of wind speed effectivity; and they are unacceptably sensitive to wind direction error, that is, the difference in direction between their heading and the wind vector.

It is an object of the present invention to provide a wind turbine which, by taking advantage of Magnus effect mechanics, avoids all of the above disadvantages.

As pertinent here, the Magnus effect may be considered basically to be that a body spinning rapidly in an environment of moving air, carries with it an envelope or boundary layer of air which is also spinning. On one side of the body the velocity of the boundary air conflicts with the velocity of the moving environment and creates a higher than ambient pressure. On the other side of the body the rapidly spinning boundary air is moving faster than the environment fluid and creates a lower than ambient pressure. The result is a push-pull force toward the low pressure and away from the high pressure side. Thusly did German physicist Gustav Magnus first explain in 1852 the errant cannonball, baseball curving, and the like.

By constructing a windmill having a plurality of coplanar cylinders or barrels provided with adequate spin and attached to a hub rotatable on a horizontal axis parallel to the wind vector, each barrel is push-pulled angularly about the hub axis providing rotational torque energy thereto.

A wind maching using these precepts was invented by Anton Flettner; and a 65 foot diameter Magnus air turbine was operating in 1927 to power a radio station near Berlin. See Flettner's U.S. Pat. Nos. 1,674,169 (filed 1924) and its reissue No. Re. 18,122 (issued 1931). It may be noted that Flettner also invented a Magnus effect sailing ship having two large, vertical, rotating cylinders instead of conventional sails. In 1926, the ship, a small freighter, made its maiden voyage from Germany to New York. By 1927 a three cylinder ship was making a scheduled run between Germany and South America.

These vessels and air turbines provided three pertinent observations; very large and useful transverse Magnus forces are generated; the machines are virtually stormproof; but in their time none of them could compete, for various reasons, with machines utilizing the advantages of cheap oil.

It is another object to provide a Magnus air turbine which is highly cost efficient in power extracted per square foot of intercepted wind.

It is another object to provide such a turbine which is very low in total cost of kilowatt hours generated over the life of the machine.

It is another object to provide such a machine which is very low in total weight per kilowatt generated.

It is another object to provide such a turbine which is stormproof and maintains its efficiency over a wide range of wind velocities including extreme transient gusts.

SUMMARY OF INVENTION

Briefly these objects are achieved in accordance with the structural aspects of an example of the invention in which a Magnus air turbine is provided which includes a nacelle housing and a polar symmetric arrangement of coplanar barrels each spinable about an axis extending radially outwardly from a main rotor hub rotatable about a horizontal axis parallel with the wind. Each of the Magnus barrels may include large circular end plates to prevent the deleterious leakage of the aerodynamic pressure between the sides of the barrel over the ends of the barrels. Spin energy to the barrels is provided through a spin drive mechanism which is powered, through a planetary differential gear assembly, by take-off from either the main hub or, generally, initially an auxiliary electric motor. After start up, the motor is usually braked and the barrels are spun at a spin velocity which is in a fixed relation to the angular velocity of the hub. When a slower barrel spin is desired, as in very high winds, the auxiliary motor may be unbraked to permit the differential gear to divert some of the spin energy to the motor causing, in its generator mode, the generation of electricity additional to that from the main generator driven by the hub.

The main rotor, or hub, driven by the Magnus cylinders in the wind carries a plurality of trolleys with rollers which compressively engage a circular track concentric about the rotor axis and fixed to the nacelle. The rotation of the rollers due to their track engagement and their being carried therealong by their respective trolleys moving with the rotor is transmitted by radial shafts to a central collector gear assembly which combines the energy from all the rollers and, in turn, transmits it, except for a barrel spin take-off component, to the main generator.

Because, for maximum efficiency, the rotor angular velocity varies with wind speed, and, because of the desirability of constant voltage and frequency of the generator output, its shaft speed should be constant, a novel variable speed drive apparatus may be interposed between the rotor and the generator. By means described below, the variable drive apparatus includes a flywheel assembly driven by the rotor at any angular velocity within a wide range; and, irrespective, within a wide range, of the flywheel velocity, the flywheel drives the generator at a constant specified velocity. The variable drive flywheel assembly also serves as a short term integrator of the rotor energy thusly eliminating the effects of both transient wind effects and transient load fluctuations.

It is to be understood that in some applications, the constant output shaft velocity is not necessary, and that in such utilizations the variable drive apparatus may be deleted from the combination.

Further details of these and other novel features and the principles of their operation and cooperation, as well as additional objects and advantages of the invention will become apparent and be best understood from a consideration of the following description taken in connection with the accompanying drawings which are presented by way of illustrative example only.

BRIEF DESCRIPTION OF THE DRAWINGS

FIG. 3 is an exploded view illustrating the major subassemblies thereof;

FIG. 4 is an enlarged cut-away view of a portion of the nacelle and rotor thereof;

FIG. 5 is a cross-sectional view of a portion of the structure of FIG. 4 taken along the reference lines 5—5 thereof;

FIG. 6 is a cross-sectional view of a portion of the structure of FIG. 4 taken along the reference lines 6—6 thereof;

FIG. 7 is a partially cut-away, partially sectional top view of a variable speed drive, load integrator, and regulator apparatus of the invention FIG. 8 is, similarly, a side view thereof;

FIG. 9 is a partially, sectioned, partially cut-away view of the gear train system for removing power from the rotor, collecting it, and spinning the Magnus barrels;

DETAILED DESCRIPTION OF PREFERRED EMBODIMENT

With specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard, no attempt is made to show or discuss structural details of the apparatus in more detail than is necessary for a fundamental understanding of the invention. The description taken with the drawings will make it apparent to those skilled in the mechanical arts how the several forms of the invention may be embodied in practice. Specifically, the detailed showing is not to be taken as a limitation upon the scope of the invention which is defined by the appended claims forming, along with the drawings, a part of this specification.

Figures 1, 2:
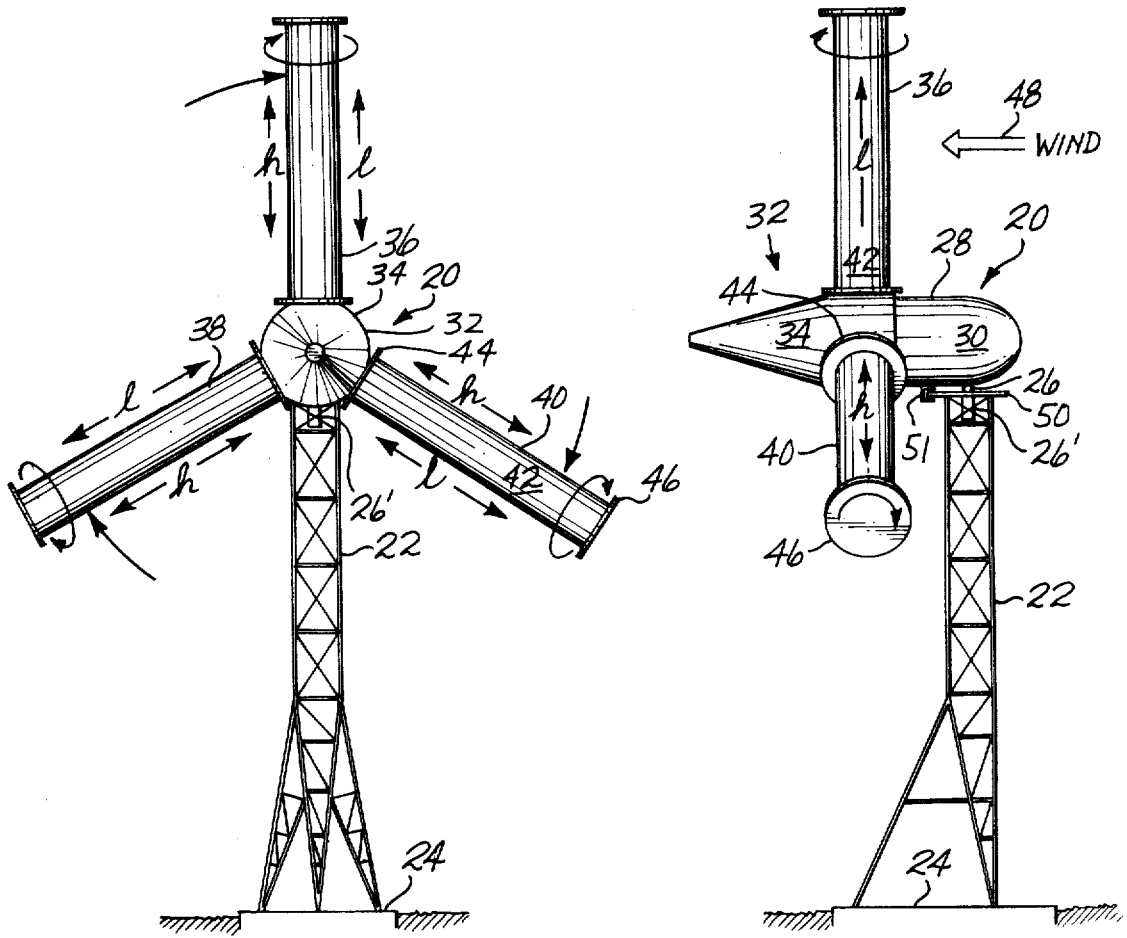
FIG. 1 is a side elevational view of an example of a Magnus air turbine system constructed in accordance with the principles of the invention.
FIG. 2 is a rear view thereof.

In the example of FIGS. 1 and 2, a Magnus effect wind turbine is shown which includes a tilt-up tower assembly 22 supported by a ground level foundation 24. The tower has a typical height of approximately one hundred feet for a turbine generating seven to eight hundred kilowatts of electrical power. The functioning of the erectable, tilt-up or down tower is described in connection with the discussion of FIG. 12.

Mounted atop the tower at a pivot shaft 26 and journal 26' is the wind turbine assembly 28 which includes a forward, upwind, nacelle 30 followed by a rotor assembly 32 having a streamlined fairing 34 and carrying a set of three angularly symmetrically disposed, torque producing barrels 36,38,40 which have their spin axes in a vertical plane and each radially disposed from the hub axis of the nacelle and rotor 32. Each barrel includes an elongated cylindrical body 42, an inner end plate 44, and an outer end plate 46. In accordance with Magnus effect theory, alluded to above, the spinning surface carries a boundary layer of air with it which interacts with the moving air indicated by the wind vector 48 to create an increased air pressure along the sides of the barrels labeled h and a decreased air pressure along the sides of the barrels labeled l, this imbalance creating the translational forces across each barrel causing cooperatively a torque of the rotor assembly about the major hub axis. The end plates 44,46 impede the "leakage" flow over the cylinder ends from the higher pressure to the lower pressure side and thereby minimize degradation of the otherwise available torque.

Another aerodynamic feature of the turbine assembly 28 to be noted is the overall teardrop shape of the fairing of the nacelle 30 and rotor fairing 34 which forces the wind at the center of its disc of interception by the turbine to flow smoothly outwardly into the region of the disc of actual energy pickup, viz. the annulus defined by the inner and outer end plates 44, 46.

Disposed about the pivot 26 at the tower top is a fixed, horizontal ring 50 which is engaged by azimuthal driving and locking means 51 carried by the nacelle 30. During certain maintenance or repair steps, it may be desirable to drive the turbine to a predetermined heading and/or lock it in such a position. It may be noted that the ring 50 does not normally carry vertical loads from the nacelle: the pivot shaft 26, described below, carries all such loads; and relatively heavy machinery, the electric generator, is disposed forwardly of the pivot 26 to balance the static loading of the turbine on the tower 22. The shaft and journal are of the character to provide vertical support to the turbine with a low-friction pivot rotation freedom. Also associated with the pivot assembly are appropriate slip ring conductors to carry electrical current out of the turbine and down the tower for feeding it into a utility grid or other utilization means. Slip rings may also be utilized to transmit starting power or signal currents into or out of the turbine assembly. Such signals may, for example, include remote control functions or signals from monitoring systems. Alternatively radio signals transmitted and/or received by the turbine assembly may serve these or other functions. Further, it should be noted that a mechanical power shaft may carry the turbine output through the pivot center to a ground location for electrical generation there or for a direct mechanical utilization of the harnessed wind power. All such details of energy utilization and its extraction from the turbine proper are outside the intended scope of this specification and are therefore not illustrated in the drawings.

Referring to FIG. 3, the major subassemblies of the wind turbine 20 are illustrated in an exploded view which is somewhat simplified for an overall understanding of the respective fixed, pivoting, rotating, and spinning portions of the invention. The tower assembly 22 may be considered to consist of (1) a lower tower 52 having an integrated pair of truss legs 54,56, for carrying the bulk of the tower forces to the foundation 24 and a third simple reacting leg 58, (2) an upper truss tower 60, and (3) a pivot support crown 62.

The remainder of the figure illustrates the turbine structure which pivots about the vertical axis 63 of the crown 62. The base structure of the turbine may be considered to be the nacelle truss 64 which is directly carried by the pivot shaft 26. It is housed within the nacelle streamline fairing 66.

The nacelle truss 64 in turn carries the rotor assembly 32 which rotates about a horizontal axis 67 and includes a hub truss 68 and the rotor streamline fairing 34. Each of the three arms 70,72,74 of the hub truss carries a bearing at its radial extremity for supporting the outer portion of its respective spinning, Magnus barrel 36,38,40. Each of the barrels has a spin axis 75,75',75", respectively, as shown.

Referring to FIG. 4. portions of these major subassemblies are shown in their overall working relationships with each other: The fixed components being the tower portion 60 affixed to its pivot crown portion 62 which carries the pivot journal 26' and horizontal ring 50; the pivoting components being the pivot shaft 26, the nacelle truss 64, the azimuthal driving and locking means 51, and its fairing 66; the rotating components being the hub truss 68 and its fairing 34; and the spinning components being the Magnus barrels 38,40. The inner end plate 44 of the barrel is shown adjacent to the hub fairing 34.

Also illustrated in FIG. 4 are the basic mechanical and electromechanical components of the turbine system. In principle these components function as follows: an electric spin motor 76 via an inner central shaft 78 initially drives a central barrel spin shaft 80 which, through a spin drive gear box 82, symmetrically drives an individual spin shaft 84,86 to spin a drive roller 88,90 engaging respectively, the base of each of the barrels 38,40.

With the barrels thusly spinning in the environment of the wind 48, normal to the spin axes of the barrels, a torque is exerted on the hub truss 68 about its rotation axis 67. The resulting rotation of the entire rotor assembly 32 is carried by an outer central shaft 92 and thence shafts 92', 94 to the main generator 96. Once the hub rotation occurs, the central spin shaft 80 is driven by a small magnitude power take-off from the main hub; and the spin motor is turned off, or stopped by a brake 97.

A more detailed description of these components and their cooperating functions follows:

The rotor assembly 32 is mounted to the nacelle truss 64 with a single central bearing 98 (through which the concentric shafts 78,92 pass) and three sets of rollers 100 which grip and roll on a circular, non-rotating track 102 which is a part of the nacelle truss 64. The centerline bearing 98 holds the rotor assembly 32 concentric with the nacelle and transmits loads, such as rotor weight, which are at right angles to the rotation axis 67. The track and rollers carry the rotor angular thrust, or drag, and any moments about axes in the plane defined by the three spin axes 75,75',75".

The set of rollers 100 includes a pair of power extractor rollers 104, 104' which are carried around the fixed track 102 thereby acquiring torque which is transmitted by roller power shafts 106, 106' to a collector gearbox 108 which, it may be noted, also rotates with the rotor assembly 32. The collector gearbox 108 symmetrically combines the power from all three pairs of roller power shafts and transmits it primarily through the shaft 92 to a herringbone gearbox 110 and thence to the shaft 92'. The gearbox 110 carries the power away from the inner shaft 78 of the spin motor and also provides, with its predetermined gear ratio, a flexibility in optimizing the angular velocity of the shaft 92'.

Because the rotational velocity of the rotor will generally vary with the wind conditions and because it may be desirable to drive the generator 96 at a constant angular velocity to provide a constant alternating current frequency output thereof, a novel energy regulator-integrator 112 may, in this example, be interposed between the shaft 92' and the generator 96. The regulator-integrator, described below, is a mechanical integrating device which receives, over a wide range, power at any angular velocity and transforms it to any other angular velocity. Accordingly, the varying input from the collector gearbox may be transformed to the particular constant input desired for the generator. It should be noted of course that when a direct current generator is utilized or when the mechanical output of the turbine 20 is extracted directly, the regulator-integrator 112 may be omitted.

The collector gearbox 108 rotates with the hub truss 68 and carries with it the housing of a spin drive differential gearbox 114. The housing of the gearbox 114 constitutes one input "shaft" to the differential; the inner cental shaft 78 from the spin motor constitutes the other; and their algebraic output is impressed upon the central spin drive shaft 80. Although the details of these gearboxes and the functions of the differential are described and discussed below, their principles may best be understood by a brief preliminary discussion.

The overall regulation of the wind turbine 20 is achieved by controlling the spin rate of the Magnus cylinders: if no spin power is applied, no hub torque is developed and the turbine is perfectly "feathered"; if a very high spin rate is used, a very high torque may be developed on the hub. In general, the output of the turbine may be readily optimized by braking the differential input shaft 78 to zero velocity and driving the other "shaft" directly by the housing of the collector gearbox 108. Thus the spin velocity of the barrel, and of its surface, is held at a constant ratio to the rotor velocity; and this relationship results in maximum aerodynamic efficiency for the windmill over a wide range of wind velocity. When an undesirably high rotor speed is developed as in a storm condition or loss of generator load, the spin motor 76 may be unbraked whereby a portion of the input on the outer "shaft" of the differential 114 is applied to the inner shaft 78 and fed to the armature of the spin motor 76. This shaft energy may be simply dissipated by the brake 97 or it may drive the motor 76 in a generator mode to develop additional electric energy which may then be utilized or resistively dissipated remotely. The control for the motor brake 97 is provided by the spin motor-generator brake control 116 which senses shaft speed by conventional tachometer means coupled to the shaft 92', or any other indicator of the hub velocity.

A simpler brake control is adequate in some applications and consists of a spring loaded means which releases the brake 97 when the drag, a function of their driven velocity, in the differential gears of the gearbox 114 causes a predetermined torque in the shaft 78.

A typical one of the outer spin barrel bearings 73 is shown carried at the outer tip of the truss arm 68. Accordingly, it may be seen that the light weight semi-monocoque structure of the barrel 38 is spin supported on and fully carried by the rotor arm 68 by the outer bearing 73, affixed also to the inner frame structure 39 of the barrel 38, and a set of rollers (described below) which includes the spin drive roller 88, carried by the rotor arm at the base of the barrel 38.

A regulator-integrator control network 117 controls the regulator-integrator 112. The network 117 receives the tachometer signals from the main power shaft 92' and from the input shaft of the generator 96. Mechanical output signals from the network 117 are then impressed on the control terminals 119,121 of the regulator-integrator to control its operation in a manner described below.

Referring to FIG. 5, the sectional view illustrates the rotor fairing 34, the base portions of the three spinning Magnus barrels 36,38,40, their inner end plates 44, the rotor hub truss assembly 68 and its three truss arms 70,72,74, the non-rotating power take-off track 102 which is fixed to the nacelle 64 (not otherwise shown in FIG. 5), three of the power extractor rollers 104' (each a part of a roller set 100) and their respective power shafts 106', and the spin drive gear box 82 and its three spin drive shafts 84,85,86 for spin driving the three Magnus barrels 38,36,40, respectively. The spin drive roller 88 is shown at the end of the spin drive shaft 84 in driving engagement with the base end of the Magnus barrel 38.

Referring to FIG. 6, the sectional view through the base or inner end of the barrel 38 shows a portion of the non-rotating ncelle 64 and the non-rotating power track 102 affixed thereto. A portion of the rotor fairing 34 and the inner end plate 44 is also illustrated.

Affixed to the rotor truss arm 72 are three, radially (about axis 75) preloaded roller assemblies 120, 122 and the spin drive roller 88. Each of these rollers is carried by a respective appropriate bracket affixed, as shown, to the rotor truss arm 72.

The rotor truss arm 72 also carries a pair of stabilizer drag rollers 124,126 affixed thereto by a bracket 128 and constituting, along with the power take-off rollers 104,104', the roller set 100. It should be noted, for clarity, that aside from their common support, the drag rollers and power take-off rollers do not achieve any special cooperation.

The power take-off rollers 104-104' are carried by a drag trolley 130 affixed by a pivot link 132 to the truss arm 72. In order to preclude the rollers 104,104' from sliding along the track 102 and wasting power and wearing flat spots on their outer diameters, it is desirable, as in railroad practice, to maintain a normal force between the rollers 104, 104' and the track of the order of three times the tangential force being transmitted at their point of contact. The offset link trolley carrying the roller 104 ahead of the roller 104' accomplishes this desired large normal contact force but only while the trolley is being dragged about the track 102; when the rotor is not in operation, there is no added such contact force, and the stresses on the involved elements of the machine are very significantly reduced. In addition, it will be noted that the net torque on the trolley 130 about the pivot link 132 due to the sum of the tangential forces drag on the rollers 104,104' is reacted by and manifest as the desired normal force of the rollers against the track; hence the normal force automatically increases and thereby tends to maintain the desired relationship of normal to tangential forces at the point of roller to track contact.

Referring to FIG. 7, the internal structure of the regulator-integrator 112 is shown to include a pair of contrarotating, high mass flywheels 134,136 mounted independently on a common axle 138 by bearing sets 140, 142, respectively. The hubs 144, 146 for the axle 138 are carried by the housing 148 which in turn is mounted on the nacelle truss 64.

The flywheels are driven by the main power shaft 92' which is spline-coupled by a spline 150 to the input shaft 152 the right hand end, as viewed in the figure, of which is affixed to a drive roller 154 which contacts, in a driving relation, each of the juxtaposed, planar flywheel surfaces 156, 158. The splined input shaft 152 is axially movable by an input spline control lever fork 160 which engages a pair of diametrically opposed pins 162 held axially firmly to the input shaft 152 by a roller bearing set 164 affixed thereto.

Similarly, an output shaft 166 is driven by a take-off roller 168 carried at its left hand end. A spline arrangement similar to that of the input side couples the power of the flywheels to the input shaft 94 of the main generator 96. An output spline control lever fork 170 controls the radial position of take-off contact between the roller 168 and the flywheel surfaces 156,158. A pair of outer shaft bearings 172,174 carried by the housing 148 support the ends of the main shafts 92', 94 which terminate with splined couplings to the regulator-integrator input and output shafts 152,166.

In FIG. 8 much of the same structure is shown in a view orthagonal to that of FIG. 7: the flywheels axle 138; the lower flywheel 136 and its upper planar surface 158; the housing 148 and the bearings 172,174 mounted therein for carrying the ends of the main shafts 92' 94; the spline 150 and the input shaft 152 coupled thereto; the spline control pin 162 and the spline control lever forks 160, 170; the flywheels input drive roller 154; and the output power take-off roller 168. Further shown in FIG. 8 are pivoted ends 176,178 of the control lever forks 160,170 mounted on the interior wall of the housing 148. Push-pull control rods 180, 182 are pivotally connected to a midpoint of the lever forks 160,170, respectively, and couple control signals at the control terminals 119, 121 from the regulator-integrator control network 117 to the lever forks.

The control of the power input parameters to the regulator-integrator 112 is achieved by the radial disposition on the juxtaposed flywheels surfaces of the point of contact of the drive roller 154. When it is disposed radially contiguously to the axle 138, the driven velocity of the flywheels is maximum while its torque is minimum. This condition is indicated by the disposition of the drive roller 154 and control fork 160 shown in phantom.

Similarly, the power output parameters are controlled by the radial position of the take-off roller with respect to the flywheel surfaces. Accordingly, a wide range of angular velocity and torque may be extracted therefrom. In particular, for generating alternating current electrical power of a desirably fixed frequency, the angular velocity of the shaft 94 is maintained constant by positioning the lever fork 170 at a diameter on the flywheels to provide the desired rotational velocity. By moving it inwardly toward the axle 138, as shown in phantom, the speed of shaft 94 is minimized; while it may be maximized by moving it radially outwardly toward the bearing 174.

Referring to FIG. 9, the power trains and gearboxes are illustrated in some detail. A typical pair of power shafts 106, 106' are shown extending from their respective power extractor rollers 104, 104' mounted on the trolley 130 which in turn is carried by the pivot link 132 on the rotor truss arm 72. A portion of the nacelle truss 64 and the fixed track 102 is shown with the latter in compressive contact between the rollers 104, 104'. Each of the power shafts 106,106' is coupled through a flat plate type flexible coupler 184 to the collector gearbox 108 whereby only power shaft torque forces are transmitted thereto from the power take-off trolley 130. Each of the three power shafts 106 terminates within the gearbox 108 in a bevel gear 186 which engages a rear pinion 188 mounted on the main, outer power shaft 92. Similarly, each of the three power shafts 106' terminates in a bevel gear 190 which engages a forward pinion 192 also affixed to the shaft 92.

Thus it is seen that all of the power from the rollers on the track 102 is coupled to the shaft 92 and accumulated there. The collected power is then fed primarily through the step-up herringbone gears 194, 196 of the gearbox 110 to the power shaft 92'. Secondarily the shaft 92 transmits power to the housing 198 of the planetary gearbox 114, the shaft 92 being affixed by a key 200 to the planetary housing 198 which constitutes one input to the differential.

The other input to the planetary gearbox 114 is the spin motor shaft 78 which terminates in a bevel gear 202 which engages a set of planetary gears 204 the hubs 205 of which are carried by the first input shaft, viz., the housing 198. The planetary gears 204, in turn, drive an output bevel gear 206 which, through the spin drive shaft 80, feeds the spin drive gearbox 82. Again, flat plate type flexible couplers 208 preclude the transmission of undesired forces by the spin drive shaft 80. The shaft 80 terminates in a central bevel gear 210 of the spin drive gearbox 82. The gear 210, in turn, engages and drives three spin shaft bevel gears 212 each affixed to the inboard end of a respective individual spin shaft 84,85,86. Through universal joint type of flexible couplers 214, the spin shafts each drive a spin drive roller such as 88 carried by the rotor truss arm 72 as shown.

The spin power supplied through the shaft 84 spins the Magnus barrel 38.

In operation, to start the turbine, the spin motor 76 is energized and applies torque on the inner shaft 78 to the input central gear 202 of the planetary differential gearbox 114. The other input, the housing 198, is motionless because the rotor is not yet turning, accordingly the gear 202 drives the planetaries 204 which in turn drive the differential output gear 206 and thence the spin drive gearbox 82. As the turbine comes up to speed, the shaft 92 turns the housing 198 and it takes over the driving of the differential output. At this point, the spin motor may be braked so that a fixed ratio of speeds between the rotor and spinning barrels may be maintained.

Figure 10:
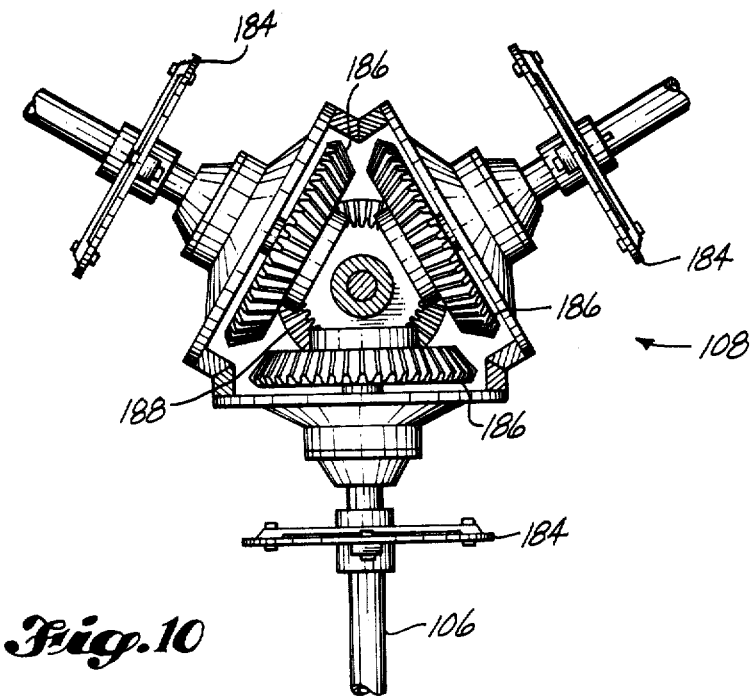
FIG. 10 is a cross sectional view of a portion of the structure of FIG. 9 taken along the reference lines 10—10 thereof.

In FIG. 10, a portion of the collector gearbox 108 is shown in cross section. The power extractor shafts 106, coupled by the flexible couplers 184 each are shown driving a bevel gear 186 which all engage the collector pinion 188.

All the gears utilized in the turbine example shown are off-the-shelf available and in this example are selected to provide the following gear ratios: The herringbone gearbox 110, 2.71:1; the spin drive gearbox 82, 2:1; the collector gearbox 108, 3:2; the planetary gearbox 114, 1:1. In addition the power extractor rollers 104 diameter are related to the track 102 length such that the shafts 104 rotate 19.75 times faster than the main rotor hub. The shaft 92 rotates 29.6 times faster than the main rotor.

Figure 11:
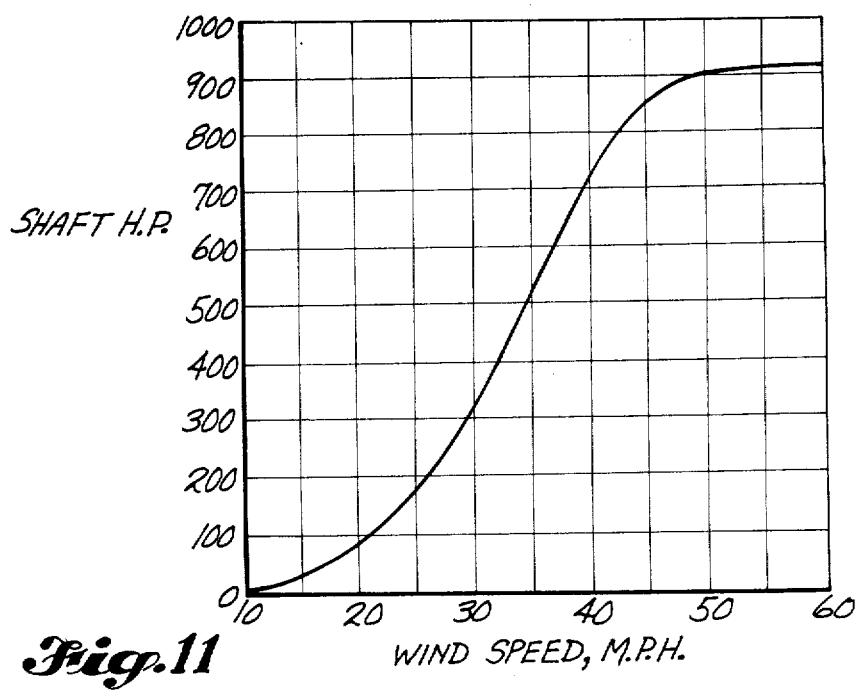
FIG. 11 is a graph plotting output power on the ordinate as a function of wind speed on the abscissa.

The graph of FIG. 11 indicates the output shaft horsepower as a function of wind speed in miles per hour. In the example shown, the turbine is optimized for wind in the range of 15 to 55 miles per hour. Above that wind velocity the spin velocity of the Magnus barrels would be undesirably high; and, accordingly, an increasing proportion of the spin energy is diverted by the planetary gearbox to the spin motor 76 which is then unbraked and allowed to function as a generator as discussed above.

Figure 12:
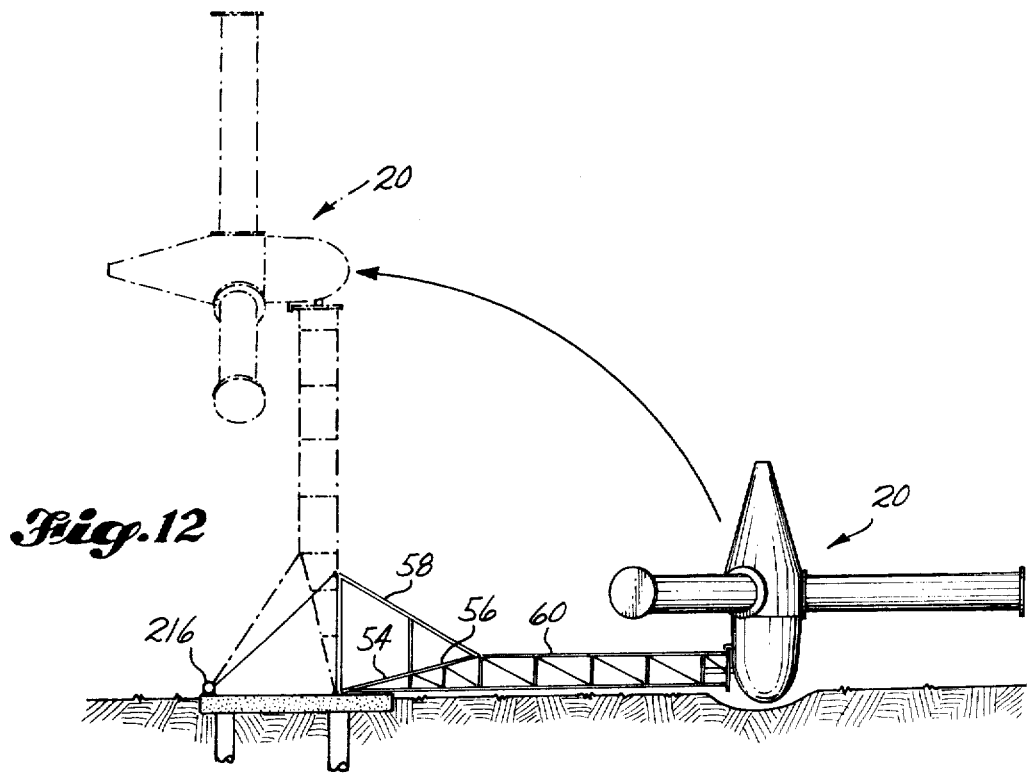
FIG. 12 is a side elevational view of the structure of FIG. 1 illustrating its initial erection.

Referring to FIG. 12, the erection of the turbine and tower is illustrated. The lower tower legs 54–56 are pivoted at their connection to the foundation 24. The turbine 20 may be assembled or overhauled and repaired in the lowered position. Then, with a winch 216 affixed to the third leg 58, the tower may be erected and the third leg securred to the foundation as shown by the phantom portion of the figure.

There has thus been disclosed and described a Magnus wind turbine system which achieves the objects and exhibits the advantages set forth earlier above.

I claim:

1. Magnus wind turbine comprising;
    fixed support means having azimuthal pivot carrying means;
    azimuthally pivotable nacelle housing mounted upon said pivot carrying means and having central bearing means with a horizontal rotor axis;
    rotor body carried by said nacelle housing and said central bearing means for rotation about said horizontal rotor axis and having a polar symmetric arrangement of spin bearing means disposed with radial axes stemming from said horizontal rotor axis and lying in a vertical plane;
    a plurality of Magnus spin barrels each carried by one of said spin bearing means and extending radially outwardly from a point adjacent said rotor body;

spin drive means for coupling spin energy to each of said Magnus barrels;

means for coupling torque energy of said rotor body to said nacelle housing;

power removing circular track means mounted in said nacelle housing in a vertical plane and concentric about said horizontal rotor axis; and power removing wheel means carried by said rotor body in driven rolling relation with said circular track means.

2. The invention of claim 1 which further includes:

central power collector means carried by said rotor body and being disposed therewithin concentric with said horizontal axis; and a plurality of power removing shaft means carried by said rotor body and connecting, in torque coupling relation, said power removing wheel means with said central power collector means.

3. The invention of claim 2 in which said central power collector means includes a primary power output shaft.

4. The invention of claim 3 which further includes electric generator means carried by said nacelle housing and coupled to said primary power output shaft.

5. The invention of claim 4 which further includes power regulator-integrator means carried by said nacelle housing and being interposed between said central power collector means and said electric generator means for receiving mechanical power from the former at varying rotational velocity and for transmitting mechanical power to the latter at substantially constant rotational velocity.

6. The invention of claim 5 in which said power regulator-integrator means includes:

inertia wheel means driven by said primary output shaft;

inertia wheel output coupler means for removing energy from said inertia wheel at a variable radius point thereof; and regulator control means coupled to said output coupler means for instantaneously controlling said radius point thereof thereby to maintain the rotational velocity of said electric generator substantially constant independently, within a predetermined range, of that of said inertia wheel means.

7. The invention of claim 6 in which said inertia wheel means includes two contrarotating, concentric flywheels.

8. The invention of claim 4 in which said central power collector means also includes a secondary, spin drive power output shaft coupled to said spin drive means.

9. The invention of claim 4 which further includes spin motor means coupled to said spin drive means.

10. The invention of claim 9 which further includes spin motor means and differential drive means having first and second input shafts and an output shaft, said spin motor means being coupled to said first input shaft, said secondary spin drive power output shaft, and said differential output shaft being coupled to said spin drive means.

11. The invention of claim 10 which further includes brake means coupled to said spin motor means for controlling energy flow from said differential drive means to said spin motor means.

12. The invention of claim 11 in which said spin motor means is of the character to function selectively as a supplemental electric generator.

13. The invention of claim 4 in which said power removing wheel means includes;

a drag trolley, pivotally carried by said rotor body; and a pair of rollers mounted on said trolley and juxtaposed one on either side of said circular track means, the pivotal connection being disposed such that as said trolley is dragged along said circular track means, the frictional drag of said rollers causes a force couple which in turn causes a rotational tendency of said trolley about said pivotal connection thereby causing a large compressive normal force between each roller and said track means, each of said rollers being rotationally connected to said central power removing shaft means.

* * * * *